(12) United States Patent
Rose et al.

(10) Patent No.: US 6,787,585 B2
(45) Date of Patent: Sep. 7, 2004

(54) COATING MATERIAL FOR MULTIFUNCTIONAL SUPERPHOBIC LAYERS

(75) Inventors: Klaus Rose, Kitzingen (DE); Matthias Heinrich, Würzburg (DE); Karl-Heinz Haas, Würzburg (DE); Michael Köhl, Britzingen (DE)

(73) Assignee: Fraunhofer-Gesellschaft zur Forderung (DE)

( * ) Notice: Subject to any disclaimer, the term of this patent is extended or adjusted under 35 U.S.C. 154(b) by 173 days.

(21) Appl. No.: 09/946,961

(22) Filed: Sep. 6, 2001

(65) Prior Publication Data

US 2002/0123561 A1 Sep. 5, 2002

(30) Foreign Application Priority Data

Sep. 7, 2000 (DE) ......................................... 100 44 216

(51) Int. Cl.[7] .......................... C08L 83/07; C08L 83/08
(52) U.S. Cl. ............... 523/135; 106/287.1; 106/287.13; 106/287.16; 106/425; 106/432; 106/436; 428/447; 524/588; 524/858; 528/35
(58) Field of Search ...................... 106/287.1, 287.13, 106/287.16, 420, 425, 432, 436, 480; 428/447, 446; 523/135; 524/588, 858, 439, 440, 430; 528/35, 34, 25, 27

(56) References Cited

U.S. PATENT DOCUMENTS

| | | | |
|---|---|---|---|
| 4,311,623 A | | 1/1982 | Supcoe ..................... 260/18 S |
| 5,453,126 A | * | 9/1995 | Gibbon ................... 106/287.13 |
| 5,760,126 A | | 6/1998 | Engle et al. ................. 524/516 |
| 5,770,269 A | * | 6/1998 | Long et al. .................. 427/387 |
| 6,210,791 B1 | * | 4/2001 | Skoog et al. ................ 428/325 |
| 2001/0031812 A1 | * | 10/2001 | Arimoto et al. ............. 524/300 |
| 2003/0091814 A1 | * | 5/2003 | Benz et al. .................. 428/328 |

FOREIGN PATENT DOCUMENTS

| | | | | |
|---|---|---|---|---|
| CN | 1132226 A | * | 10/1996 | ............ C09D/1/00 |
| DE | 44 18 214 C2 | | 11/1995 | |
| DE | 19501 114 A1 | | 7/1996 | |
| DE | 196 39 783 A1 | | 4/1998 | |
| DE | 196 50 300 A1 | | 6/1998 | |
| DE | 198 56 171 A1 | | 6/1999 | |
| EP | 0 587 667 B1 | | 3/1994 | |
| EP | 0 748 775 A2 | | 12/1996 | |
| JP | 03115471 A | * | 5/1991 | ............ C09D/5/00 |
| JP | 08-269729 A | | 10/1996 | |
| JP | 11083027 A | * | 3/1999 | ............. F24C/7/04 |

OTHER PUBLICATIONS

D. Sporn et al., Spektrum Der Wissenschaft, "Vom Mottenauge abgeschaut—ultrafeine strukturen für die Entspiegelung", pp. 20–22 (1997).

L. V. Wake, J. Oil Color Can. Assoc., "The effect of pigments in formulating solar reflecting and infrared emitting coatings for military applications", pp. 78–81 (1990).

S. Sepeur et al., Wekstoffwoche 1999—Euromat–Session.

* cited by examiner

Primary Examiner—Margaret G. Moore
Assistant Examiner—Marc S Zimmer
(74) Attorney, Agent, or Firm—Foley & Lardner

(57) ABSTRACT

A coating material for interior walls and exterior facades has heat reflection and oleophobicity/hydrophobicity, properties. The material is either opaque to visible light and/or contains a material which provides opacity. It includes:

a) at least one silane of the formula (I)

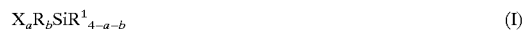

$$X_a R_b SiR^1{}_{4-a-b} \quad (I)$$

in which
X is a hydrolyzable group,
R is optionally substituted alkyl, alkenyl, aryl, alkylaryl or arylalkyl,
R[1] is an organic radical which is attached to the silicon via carbon and carries a reactive group,
a is an integer from 1 to 3, and
b is an integer from 0 to 2,
or a (partial) condensate of this silane, b) at least one infrared-reflecting pigment whose particle size is situated primarily in the range from 1 to 50 µm, and c) a solvent and/or dispersion medium.

13 Claims, No Drawings

1

COATING MATERIAL FOR MULTIFUNCTIONAL SUPERPHOBIC LAYERS

The present invention is directed to coating materials which can be used to produce layers which are not only extremely oil- and water-repellent but also IR-reflective. The coating materials are particularly suitable as paints, e.g., as interior paints or masonry paints.

Easy-clean, dirt-repellent or self-cleaning layers are known in a number of variants. For example, there are purely hydrophobic coating systems which are based on nonpolar coating materials. Where not only an oil/fat-repellent but also a water-repellent finish is required, fluorine components are generally employed. Thus, DE-A-41 18 184 reported that layers containing fluorine or fluorosilane may exhibit anti-adhesion (hydrophobic/oleophobic) effects. Additionally, U.S. Pat. No. 5,760,126 describes fluorine-containing coatings, which are water-based.

One self-cleaning effect of surfaces has become known as the "lotus effect". It is based on the presence of certain, defined surface structures of hydrophobic materials and is modeled on nature, which brings about the dripping of water from the leaves of plants in a similar way (see EP 772 514 B1). Moreover, it has been reported that a combination of oleophobic and hydrophobic properties can be achieved by means of fractal structures which are disposed in the form of fluorosilane-treated Eloxal layers on aluminum.

The theory of wetting predicts that, at liquid contact angles on the substrate surface of more than 90°, roughening of the surface leads to reduced wetting. Below 90°, increased wetting occurs. For applications on transparent substrates such as glass, for example, roughnesses in the nm range are needed. For example, B. S. Hong et al., in Proc. 2nd Int. Conf. on Coatings on Glass (ICCG), Saarbrücken, 1998, pages 388 to 392 investigated a controlled separation of sol-gel systems for the purpose of generating nanoroughnesses and made use of its effect on wetting properties. In the Werkstoffwoche 99 Euromat session "Properties and Technological Applications of Nanostructured Materials", S. Sepeur et al. reported on the effect of the surface roughness of perfluorinated nanocomposite materials with high scratch resistance. The incorporation of silicon dioxide particles with a diameter of 230 nm significantly increased the hydrophobic and oleophobic properties of the surface. Instead of producing surface roughnesses by influencing the properties of the material, surfaces may also be structured by techniques such as embossing or the like. For instance, D. Sporn et al., in Specktrum der Wissenschaft, page 20–22, 1997, reported on ultrafine structures for antireflection coating which were "taken as seen from the eye of the moth".

Coating materials with low emissivity in the region of thermal radiation have been disclosed by G. Hugo in DE 44 18 214 C2. In that document, a binder with high transparency in the range from 3 to 50 μm has incorporated into it a pigment which likewise possesses a high transparency within this range, but where the refractive index of the binder is different than that of the particles in the stated region of thermal radiation. Pigments proposed particularly include the fluorides, chlorides, selenides and sulfides of metals. The IR reflection maximum can be adjusted by way of the particle size and by the combination of pigments (DE 195 01 114 A1 and 196 50 300 A1). Pigment from brown rutile has also been described as exhibiting a high degree of infrared reflectiveness. DE 198 56 171 discloses the use of functional pearlescent pigments in transparent media which are suitable as coatings for the outside of buildings and which have angle-selective transmission and/or reflection properties in the visible region. The effect of IR-reflective pigments on the heat balance of buildings and in connection with military applications has been described by L. V. Wake in J. Oil Color Chem. Assoc., pages 78 to 81 (1990). Heat reflection may also be achieved through the use of hollow ceramic beads in a polymer matrix. Products having such ingredients are already being marketed for interior coatings; they are said to save up to 10% of heating costs.

DE 196 39 783 A1 to Merck, Hüls AG, describes metal oxide-coated pigments especially for water-based coating systems. The pigments have the structure of platelets atop whose topmost metal oxide layer there is an outer layer comprising certain oxides and/or mixed oxides. As the aqueous coating system, oligomeric silane systems are described. These systems develop silicon-functional hydroxyl groups which form chemical bonds with the hydroxyl groups of the pigment surfaces. The pigments do not have reflection properties in the infrared region.

U.S. Pat. No. 4,311,623 proposes the incorporation of zinc sulfide and other pigments into silicon-alkyd resins.

DE 197 26 862 A1 describes a process for producing a transparent protective layer, having reflecting properties in the infrared region, which can be used to coat transparent polymer plates or glass plates used in refrigeration or freezing apparatus. The protective layer is preferably of two-part construction, in which a thin metal sulfide layer is applied to the polymer or glass and overcoated with a so-called ORMOCER. An alternative proposal is to incorporate an additive having reflecting properties directly into such an ORMOCER.

It is an object of the present invention to provide coating materials from which coatings having excellent oleophobicity/hydrophobicity and, at the same time, heat-reflective properties can be produced. The materials should be suitable for processing by wet coating techniques and should preferably be self-curing, in order that they may be used as paints (e.g masonry or interior paints). Desirably, furthermore, they are solvent-free or contain only a small fraction of solvent. Where solvents are needed, they should as far as possible be nontoxic and environmentally friendly/readily biodegradable.

It has surprisingly been found that this object can be achieved through the provision of coating materials which comprise IR-reflective pigments having dimensions in the range from about 1 to 50 μm or hollow beads having the same dimensions.

Before they are applied to the intended substrate, the coating materials should possess a viscosity at which they may be applied with conventional means such as rollers or brushes, by spraying, or otherwise. They must be or should be relatively mobile, such that following application the pigment particles in the near-surface layers are covered by a binder layer which is extremely thin, forms a stochastic surface structure, and yet is sufficiently thick to retain weathering stability. Viscosities like that possessed, for example, by honey when stored in the cold (i.e., which are sticky as honey), on the other hand, should be avoided. The coating material may be adjusted to an adequate viscosity where appropriate by separating off or adding solvent and/or dispersion medium (preferably water). In this way it is possible to dispense with additional surface structuring operations such as embossing or the like.

The dirt repellency properties (oleophobicity and hydrophobicity) of the layers formed from the coating material are improved still further by the binder of the coating materials and, respectively, of the coatings comprising at least one optionally organically polymerizable/polymerized silane of the formula (I)

$$X_aR_bSiR^1{}_{4-a-b} \tag{I}$$

in which
- X is a hydrolyzable group,
- R is optionally substituted alkyl, alkenyl, aryl, alkylaryl or arylalkyl,
- $R^1$ is an organic radical which is attached to the silicon via carbon and carries a reactive group, especially one able to enter into organic reactions,
- a is an integer from 1 to 3, and
- b is an integer from 0 to 2, or a (partial) condensate of this silane. Such (partially) condensed, optionally organically modifiable/modified silanes have been described in large numbers; the condensates, alone or in a mixture with further (partly) hydrolyzed metal compounds and/or organic components, are frequently referred to collectively as ORMOCERS®. Particularly preferred such coating materials are those which are self-drying. Suitable self-drying materials are those, for example, formed from sol-gel systems. The silanes are hydrolyzed by adding an appropriate amount of water and are partly or fully condensed. Following the application of the material to a substrate that is to be coated, the solvent present evaporates or vaporizes. In this context it is also possible where appropriate to effect ultimate crosslinking and curing by means of further condensation. In some embodiments of the invention, the silanes have been or are additionally crosslinked with one another and/or with purely organic components of the coating material by way of organic groups, specifically by polyaddition or addition polymerization reactions. In order to circumvent the need to use heat or UV radiation to cure such systems, it is preferable in such cases to bring about organic crosslinking even before the coating material has been applied to the substrate. In these preferred cases it must of course be ensured that the viscosity of the material does not rise too sharply and/or that an appropriate amount of diluent or dispersion medium is added.

Highly suitable for the purposes of the present invention are optionally partially condensed silanes of the formula (I) having the following indices:
- X is hydrogen, halogen, hydroxyl, an optionally substituted alkoxy, acyloxy, alkylcarbonyl or alkoxycarbonyl group having preferably 1–8, more preferably 1–4 carbon atoms in the alkyl or acyl group, $NR^3$ where $R^3$ is hydrogen, optionally substituted alkyl having preferably 1–8 and more preferably 1–4 carbon atoms or optionally substituted aryl; and R is an optionally substituted alkyl, alkenyl, aryl, alkylaryl or arylalkyl group having 1–10, frequently having 1–4 alkyl carbon atoms. In one particularly preferred embodiment, the radical R is partially substituted by fluorine—for example, in one of the abovementioned groups having from 6 to 10 carbon atoms and 4–8 fluorine atoms. Where a group $R^1$ is present in the molecule, $R^1$ preferably carries at least one amino, epoxide, vinyl or (meth)acrylate group. The presence of such groups frequently has the advantage that the pigments are incorporated more effectively in the matrix of the coating. For example, diols, which may come about by hydrolysis from epoxy groups, or amines have a high degree of affinity with the pigments that may be used.

Particularly suitable for the purposes of the present invention are coating materials comprising at least two different, optionally partially condensed silanes, in which case at least one silane of the formula (III)

$$X_aR_bSiR^1{}_{4-a-b} \tag{III}$$

is used, in which X possesses the same meaning as indicated for formula (I), $R^1$ possesses the same meaning as indicated for formula (I) and is preferably a $C_1$–$C_6$ alkyleneamine, and a+b is 3, and as crosslinking agent there is at least one silane of the formula (IV)

$$X_aSiR_b \tag{IV},$$

in which a is an integer from 1 to 4, a+b is 4, X is preferably a $C_1$–$C_4$ alkoxy and R is preferably a $C_1$–$C_4$ alkyl, or an oligomeric condensate of these silanes, which may have been formed by separate or joint hydrolysis of the silanes. An example of silanes of the formula (III) are omega-aminoalkyl-alkyl-dialkoxysilanes having $C_1$–$C_3$ alkyl groups; specific representatives of these silanes that may be mentioned include 3-aminopropyl-methyl-diethoxysilane or 3-aminopropyl-triethoxysilane. Examples of silanes of the formula (IV) are di-, tri- or tetraalkoxysilanes having $C_1$–$C_3$ alkoxy groups; specific representatives that may be mentioned include tetraethoxysilane and dimethyl dimethoxysilane. Examples of oligomeric condensates are siloxanes of the formula R—[OSi(OR)$_2$]$_n$—OR where R is methyl or ethyl and n is 2 or 3, e.g., Dynasil 40 or Dynasil 50 from Hüls.

The silane(s) of the formula (I) and/or (III) or its/their (partial) condensates may suitably be present in an amount of about 5–95 mol %, based on all the constituents of the binder (e.g., all the constituents of the coating material with the exception of water, any further solvent and pigment). The amount is preferably about 10–50 mol %. Silane of the formula (IV) may, where present, be in an amount of preferably up to 50 mol %, based arithmetically on the total molar amounts of monomeric silane. The amount is preferably about 10–50 mol %, more preferably about 25–45 mol %.

Also particularly suitable for the purposes of the present invention are coating materials comprising one or more silanes of the above-indicated formula (IV) but without the addition of silanes of the formula (III), in which case these silanes form the "framework" of the condensed coating material. Specific examples of such silanes are dialkyldialkoxysilanes, e.g., dimethyldimethoxysilane or diethyldiethoxysilane, or alkyltrialkoxysilane, e.g., methyltrimethoxysilane or ethyltriethoxysilane, which may be used alone or in a mixture.

In one embodiment of the invention, the coating material comprises not only one or more optionally partially condensed silanes of the formula (I) (and/or (III) and/or (IV) as elucidated above) but also at least one metal compound of the formula (II)

$$M(OR^2)_n \tag{II}.$$

The metal M in this compound should be selected from those elements of the main groups and transition groups of the periodic system which are formally able to exist in the oxidation state 3 or 4. Preferably it denotes Ge, Sn, Pb, Ti, B or Al. Depending on valence, M [sic] denotes 3 or 4. $R^2$ in this formula preferably has the same meaning as R in the formula (I). Since many metal compounds with the formal oxidation state 3 or 4 may also be present in the form of complexes with a multiplicity of ligands, the coating material may instead or additionally, however, include compounds as well in which some or all of groups $OR^2$ of the formula (II) have been replaced by one or more ligands L which are bonded more strongly to the metal M than is the group (OR²). These compounds possess the formula (V)

$$(R^2O)_m ML_n \quad (V)$$

in which

M is with very particular preference Ti, Zr and Al, and/or

R² is with very particular preference $C_1$–$C_6$-alkyl and/or

L is with very particular preference selected from

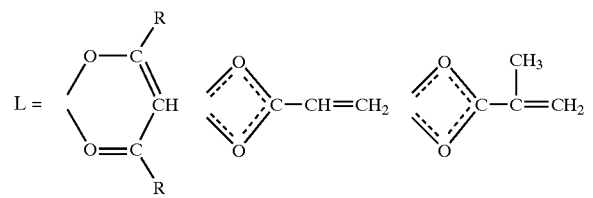

m being an integer from 1 to 3 and n being an integer from 1 to 3.

Preferably, compounds of the formula (II) and/or (V) are present in an amount of up to 50 mol %, based arithmetically on the total molar amounts of monomeric silane, preferably of 5–20 mol %.

In a further embodiment of the invention, in which the above metal compounds of the formula (II) and/or (V) may be present or not, and in which the silane or silanes may have any one of the aforementioned definitions, but are preferably present in the embodiments described as particularly suitable, the coating material further comprises at least one polymeric additive serving as a thickener or dispersant. Examples of such are polyvinyl alcohol, polyvinyl acetate, polyvinylbutyral copolymers of these substances in any desired combination, poly(meth)acrylates and copolymers thereof, (meth)acrylic/styrene copolymers, polyacrylic acid, acrylic acid-maleic acid copolymers, styrene/allyl alcohol copolymers, poylvinylpyrrolidone [sic] and vinylpyrrolidone/acrylic acid copolymers. These substances are preferably in the form of low polymers.

The abovementioned polymers may be present in the form of straight additives or, following modification and/or copolymerization with monomeric alkoxy silanes, may be connected to the silane condensate matrix as a consequence of hydrolysis and condensation. They are added advantageously in an amount of up to 80% by weight, based on the total amount of the constituents of the coating material with the exception of water and any solvent. An amount of 10–60% by weight is preferable.

It is also possible for organic monomers such as (meth) acrylates to be copolymerized with silanes of the formula (I) in which a+b is not more than 3 and the group $R^1$ carries an organic polymerizable radical, e.g., a vinyl or methacryloxy-alkyl group. Such silanes may, for example, be vinyldi- or -trialkoxy silane or methacryloxypropyltrimethoxysilane. Their amount may be situated in the region of that which was stated above for the organic polymers.

Instead of this or additionally it is possible for organic polymers like those mentioned above to be modified subsequently with appropriate silanes. One example of this is the modification of polyvinyl alcohol with 3-triethoxysilylpropylsuccinic anhydride or with isocyanatopropyltriethoxysilane;

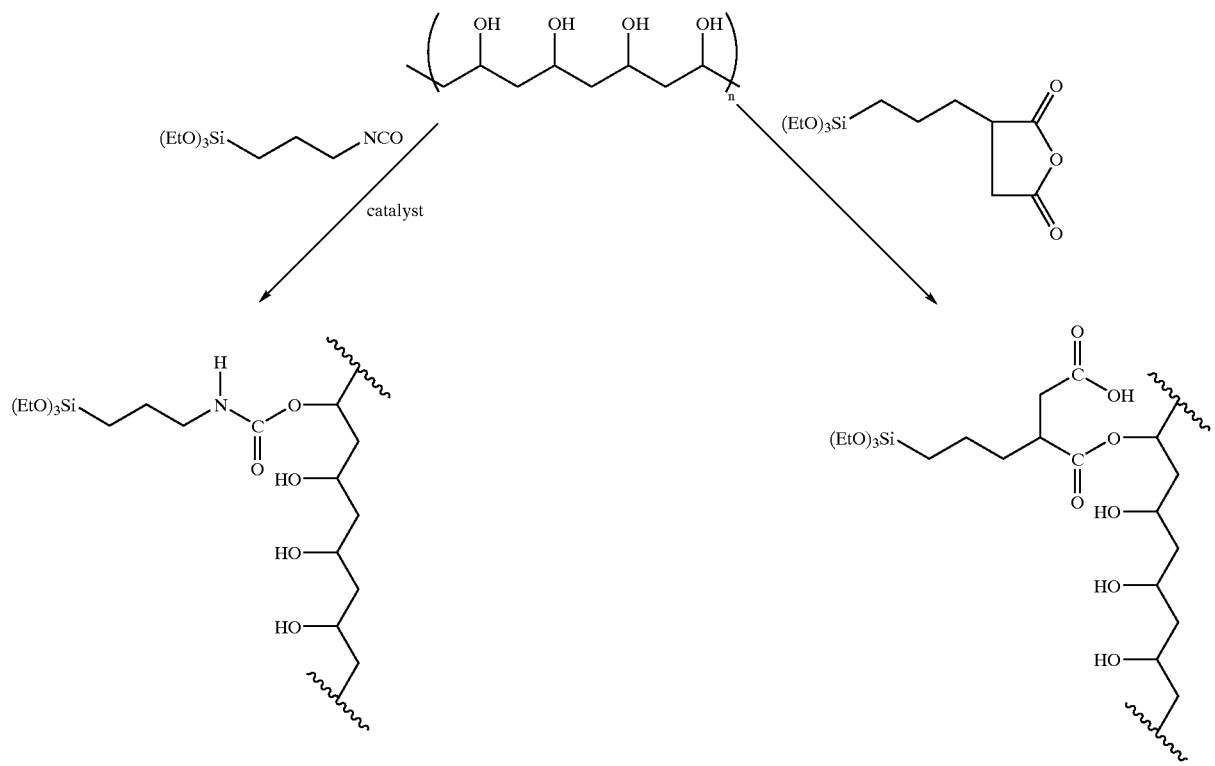

or

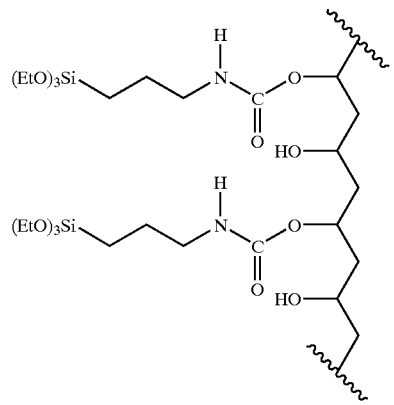

This example may also be applied to other mentioned substances, e.g., to polyvinylbutyral.

A further possibility of polymer modification is the reaction of polymers containing acid groups, such as polyacrylic acid, with amino silanes, e.g., $H_2N-(CH_2)_x-Si(OR)_3$ where x is preferably 1–4 and R is preferably methyl or ethyl, to give the acid amide with hydrolyzable groups.

A further improvement in the dirt repellency effect is achieved through the incorporation of fluorinated alkyl chains which, as mentioned above, may be bonded to the silanes of the formula (I), but may also be incorporated into the coating material through the addition of fluorinated organic compounds. Indeed, it is not critical whether the fluorinated groups are attached to the silicon network and/or to the organic polymer network—which may be linked to the silicon network. It is preferred for the fluorine groups to orient themselves toward the surface of the coating produced from the coating material. In one preferred embodiment, the coating material comprises optionally partially or fully hydrolyzed/condensed silanes of the formula (IV) as described above, together with silanes of the formula (I) in which R is a partially fluorinated alkyl radical, preferably a $C_6-C_{10}$ alkyl radical having about 4–16 fluorine atoms, preferably with 4–8 $CF_2$ groups, and also, if desired, one or more metal compounds of the formula (II) and/or (V).

A particularly good beading effect is achieved through the incorporation of hollow melamine/formaldehyde or urea/formaldehyde microbeads having diameters of, e.g., 1–30 μm into the coating material of the invention. With coating materials which include such hollow beads it is possible to measure wetting angles of up to 145°.

The IR-reflecting pigments which may be used in the present invention are not subject to any restriction, provided they are present substantially or to large extents (preferably more than 50%, more favourably more than 75%) in the sizes specified above. Highly suitable for the invention are electrically conducting metal spangles, which may be coated for the purpose of imparting color and/or preventing corrosion, or dielectrics having a sufficiently large difference in refractive index (preferably at least 0.1, more preferably about 0.2 to 0.3) from the binder. It is also possible to use hollow, open or closed dielectric beads whose refractive index is in this case close to 1 and which develop their maximum activity as centers of scattering in binders having a relatively high refractive index. It is particularly preferred to use pigments having high reflectivity in the wavelength range between 8 and 14 μm. Where coating materials having these properties are in fact used as masonry paint, there is a particular reduction in the radiation losses, as a result of which the surface temperature rises and the heat losses of, say, the painted house fall. Moreover, there is a reduction in the frequency with which the temperature falls below the dew point. This also is advantageous, since dew deposition leads to water absorption and soiling.

Examples of suitable infrared-reflecting pigments that may be mentioned include metals and metal alloys, especially aluminum, chromium, iron, copper, nickel, silver, gold, iron, tin, zinc, bronze, brass, ferrous alloys, and nickel alloys. Metal sulfides as well may be used, especially copper, lead, and zinc sulfide, and also metal fluorides, especially calcium fluoride, barium fluoride and sodium fluoride, and metal oxides, especially zinc oxide, titanium dioxide, magnesium oxide or antimony dioxide. Examples of dielectric pigments are ceramic or vitreous pigments.

The amount of pigment in the coating material is advantageously at least 5% by weight, based on all the constituents of the coating material with the exception of water and any further solvent; it is advantageous to choose up to 60% by weight, and with very particular preference 15–50% by weight.

As already mentioned, the pigments themselves may have been appropriately coated or surface-derivatized. If the surface exhibits hydroxyl groups, the pigments may for example be incorporated into the network, thereby removing the possibility of them possibly settling on prolonged standing. Moreover, they may have been provided with a colored layer, if they do not themselves have an appropriate color. By this means it is possible to produce any desired color effects, for masonry paints, for example. Naturally, a masonry paint may also be white—as a result, for example, of the addition of gypsum, talc, chalk or titanium dioxide.

Infrared-selective masonry paints influence the radiation balance of the outsides of buildings and therefore have consequences for the surface temperature of the facade. As a result, it is possible to achieve important effects, some of which have already been elucidated above, for the utility of the building. Surprisingly, however, in the course of the use of the coating materials of the invention, an effect which is above all synergistic has been established. As a result of the dirt-repellent surface of the interior and exterior coatings produced from or with the coating materials of the invention, indeed, the infrared reflection effect is retained for longer, since instances of soiling generally have a higher degree of thermal emission and hence increase the heat radiation given off. Through the combination of IR radiation and fat/oil and water repellency properties, the periods of dewing are reduced and the wetting or soaking of the outer skin of the building is significantly lowered. Conversely, the pigments also bring about a synergistic improvement in the dirt repellency effect of the masonry paint, since pigments comprising a hydrophobic/oleophobic matrix have a very good beading effect with respect to water droplets (contact angles in the region of approximately 130° may be measured on coatings even without hollow organic microbeads).

The use of organically modified silanes as starting compounds in the coating materials makes it possible in many cases, moreover, to operate in exclusively or substantially aqueous systems, thereby making the materials of the invention environmentally compatible. The coatings obtained have a high weathering stability.

To prepare the coating materials of the invention, it is possible to start by introducing the chosen silanes, in monomeric form or already in partially condensed or organically prepolymerized form, in a solvent, which is preferably water. It may be necessary to add water to the solvent. Following hydrolysis and condensation, organic monomers or polymers may be added if appropriate. Where they are to be polymerized onto the silane(s) by way of organically polymerizable groups, the corresponding reaction is made possible, by for example adding initiators and exposing the system to heat or UV radiation. Where metal alkoxides of the formulae (II) or (V), possibly in complexed form, are to be added, it is advantageous to effect this as the next step, by for example adding a corresponding alkoxide in an optionally complexing solvent such as acetone or acetylacetonate. Conversely, it is of course also possible to add the silane or silanes in monomeric or precondensed form to a mixture of optionally complex metal alkoxide of the formula (II) and (V) and, if desired, organic monomers or polymers in an appropriate solvent or complexing agent and then to add the amount of water necessary for the hydrolysis. Finally, the intended amount of pigment is added. Where necessary, the viscosity of the resulting mixture is raised or lowered by adding or removing water or other solvent. Furthermore, provision may be made to replace any water present by another, preferably low-boiling solvent, in order to facilitate or accelerate the process of drying of the applied coating.

With this sol-gel preparation process, a coating material is obtained which may be used, for example, as an interior or masonry paint or may be admixed to conventional paints of this kind. Following application to a substrate, by rolling, brushing or knife coating, for example, the material may be dried and, where appropriate, cured until it is no longer tacky.

The invention is illustrated below with reference to examples.

EXAMPLE 1

|      | AMDEOS 1 | TEOS 2 | Polyacrylic acid 3 | Ti (OEt)$_4$ 4 | EAA 5 |
|------|---------|--------|---------------------|----------------|-------|
| MW   | 191.36  | 208    | *)                  |                |       |
| mmol | 10      | 1      | 6.84                | 1              | 4     |
| g    | 1.91    | 0.208  | 0.5                 | 0.22           | 0.52  |

AMDEOS 3-aminopropylmethyldiethoxysilane
TEOS = tetraethoxysilane
EAA = ethyl acetoacetate
*) = (500,000 to 1,000,000) monomer unit: 73.04

1 and 2 are mixed and dissolved in 10 g of water. The sol is prehydrolyzed for 20 minutes, then 3 is added. This results in a sticky, highly viscous liquid, to which the freshly prepared complex of 4 and 5 is added.

0.93 g of the pigment Paliochrom R2/237 (BASF) is incorporated in the solution by dispersion. The resulting suspension is knife coated onto a substrate in a layer thickness of 80 μm. The layer dries to a tack-free state within 1 h. Contact angle with respect to water: 82°.

EXAMPLE 2

|      | PVA 22,000 1 | Ti(OPr)$_4$ 2 | AMEO 3 | Me$_2$Si(OMe)$_2$ 4 |
|------|--------------|---------------|--------|---------------------|
| MW   | 44           | 284.37        | 179    | 120.22              |
| mmol | 100          | 10            | 10.2   | 22.79               |
| g    | 4.4          | 2.84          | 1.84   | 2.74                |

PVA = Polyvinyl alcohol
AMEO = Aminopropyltriethoxysilane

Variant a)

1 is suspended in 10 g of acetone and then 2 is added. The resulting suspension is stirred, and 20 g of water are added. In succession 3 and 4 are added, and the mixture is stirred overnight. After 10 g of solvent have been stripped off, a white, viscous suspension is obtained (31.8 g with solids content of 24.3%). 3.19 g (corresponds to 10% in respect of the total amount or 43% in respect of the ORMOCER components) of Paliochrom R2/237 (BASF) are suspended. The mixture is knife coated onto a substrate in a wet film thickness of 120 μm. The layer dries to a tack-free state within 1 h.

Variant b)

0.36 g of polyacrylic acid (MW 2000), 65% in water, is added to the suspension of variant a), and the mixture is applied by knife coating in a wet film thickness of 120 μm. After one hour at room temperature, the layer has likewise reached a tack-free state.

EXAMPLE 3

20 mmol (4.96 [lacuna]) of methacryloxypropyl-trimethoxysilane and 5 mmol (1.04 g) of tetraethoxysilane are added to a dispersion of 3.26 g of sodium dodecylbenzenesulfonate and 1 g of Paliochrom R2/237 (BASF) in 20 ml of EtOH, and during the dispersion process this system is hydrolyzed with 0.72 g of 0.1 N aqueous NH$_4$F solution (corresponds to 40 mmol of water). The suspension is stirred overnight.

Following the addition of TRIGONOX 21 Akzo-Nobel (3% in respect of the amount of silane weighed in), a layer is knife coated onto glass in a wet film thickness of 120 μm and is cured at 130° (1 hour).

The IR reflection of the pure pigment is integrally 70%.

EXAMPLE 4

Silanization of Polyvinyl Alcohol:

a) 35.2 g (0.8 mol, with respect to one monomer unit) of polyvinyl alcohol having an average molecular weight of 22,000 and 49.4 g (0.2 mol) of 3-isocyanatopropyltriethoxysilane were mixed, and then 2.4 g (0.004 mol) of dibutyltin dilaurate were added. After 4 h of stirring with heating (50–60° C.), the isocyanatosilane had been consumed by reaction and the mixture was suitable for use.

b) 13.2 g (0.3 mol, in respect of one monomer unit) of the same polyvinyl alcohol which was used for Example 4(a) and 30.4 g (0.1 mol) of 3-succinic anhydride-propylethoxysilane were mixed and stirred for 2 h with heating (60° C.) and then for 16 h at 20° C. until the succinic anhydride-silane had been consumed by reaction. The mixture was subsequently processed further in unchanged form.

EXAMPLE 5
Silanization of Styrene/Allyl Alcohol Copolymers:

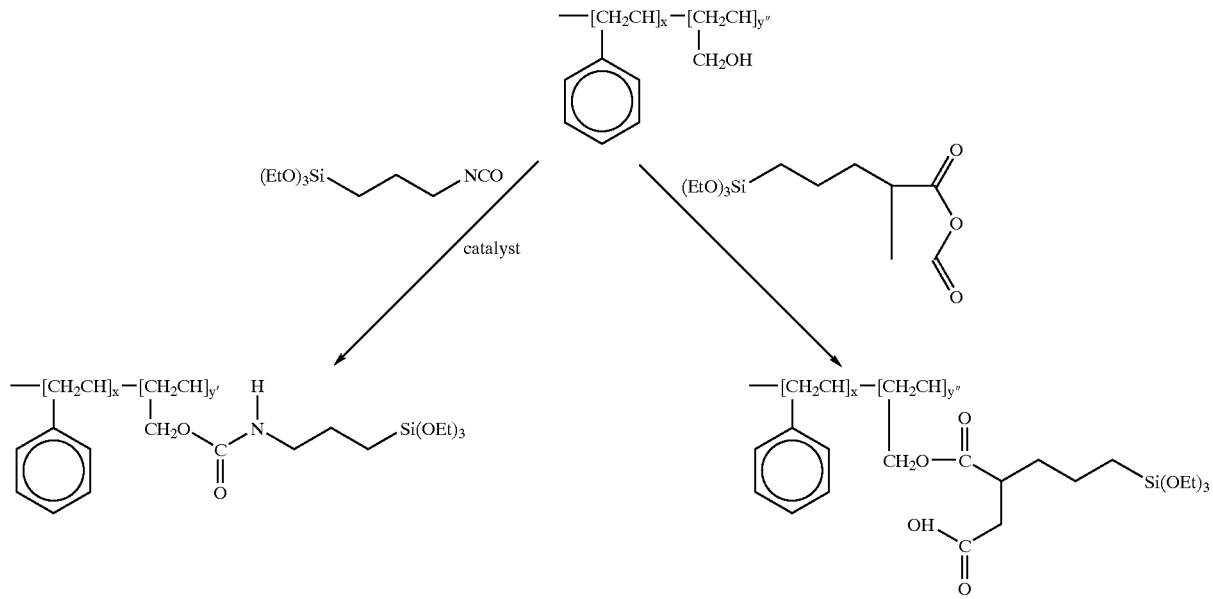

a) 85.6 g (0.4 mol based on one theoretical monomer unit) of a styrene/allyl alcohol copolymer as shown as starting material in the above formula scheme, having an average molecular weight of 1200 and an x:y ratio of 60:40 (theoretical monomer unit comprising 1.5 x and 1 y: molecular weight 214) were dissolved in 40 g of acetone. Then 24.7 g (0.1 mol) of isocyanatopropyltriethoxysilane were added. Subsequently, 1.26 [lacuna] (0.002 mol) of dibutyltin dilaurate were slowly added dropwise to the mixture, which warmed up slightly in the course of the addition. This mixture was then stirred at 20° C. for a further 16 h.

b) 85.6 g (0.4 mol, based on one theoretical monomer unit) of the same styrene/allyl alcohol copolymer as used in Example 5(a) were dissolved in 40 g of acetone. Then 30.4 g (0.1 mol) of succinic anhydride-propyltriethoxysilane were added. The mixture was stirred first under reflux for 8 h and then at 25° C. for 16 h.

EXAMPLE 6

The preparation of coating materials using silanized polyvinyl alcohol or silanized styrene/allyl alcohol copolymer:

The following abbreviations are used:

PVAl=Polyvinyl alcohol, unmodified

Iron pigment=Paliochrom R2/237 (BASF)

PVAl-Si=Polyvinyl alcohol, modified with isocyanate-silane

Al-EAA—Complex of aluminum tri-secondary-butylate with ethyl acetoacetate

F-silane=$C_6F_{13}C_2H_4Si(OEt)_3$

Styrene-allyl-Si=Styrene/allyl alcohol copolymer

Preparation of dispersions (general process):

Variant a):

Mix Dynasil 40, $Me_2Si(OMe)_2$, Al-EAA, F-silane in acetone, then add the amount of water necessary for the stoichiometric hydrolysis of all the alkoxy groups and leave with stirring at 20–25° C. for one hour. Addition of dispersant, then stirred incorporation of silanized polyvinyl alcohol or unmodified polymer (PVAl, polyacrylic acid) and leave stirring for a further hour.

Variant b):

Dynasil 40, $Me_2Si(OMe)_2$, Al-EAA, F-silane, and silanized styrene/allyl alcohol copolymer are dissolved in acetone. Addition of the amount of water required for stoichiometric hydrolysis of all the alkoxy groups, and leave stirring at 20–25° C. for 1 hour. Addition of dispersant.

Further processing analogously for variant a) and b): Addition of the calculated amount of water in order to give a solids fraction of 20–30% following removal of acetone. Removal of acetone by evaporation with stirring at room temperature or distillation under vacuum. Addition of dispersant and stirred incorporation of IR-reflecting metal pigment.

Pigments: IR-reflecting metal pigments (e.g. Paliochrom R2/237)

Additives: dispersant (e.g., cetyltrimethylammonium bromide; Disperbyk 190, Disperbyk 192 from Byk Chemie GmbH, Wesel)

Contact angle of some layers, dried at room temperature with and without IR-reflecting pigment:

| (molar) composition | | contact angle (water) |
|---|---|---|
| PVAl/$Me_2Si(OEt)_2$/$Ti(OEt)_4$ + 40% (with respect to solid fraction) iron pigment | 1:0.2 | 135° |
| PVAl/$Me_2Si(OEt)_2$/$Ti(OEt)_4$/polyacrylic acid + 40% (with respect to solid fraction) iron pigment | 1:0.2:0.1 | 120° |
| PVAl-Si/Al-EAA/Dynasil 40 | 1:1:1 | 68° |

-continued

| (molar) composition | | contact angle (water) |
|---|---|---|
| PVAl-Si/Me$_2$Si(OEt)$_2$/Dynasil 40/Al-EAA | 1:2:1:1 | 70° |
| PVAl-Me$_2$Si(OEt)$_2$/Dynasil 40/Al-EAA | 1:4:1:1 | 95° |
| PVAl-Me$_2$Si(OEt)$_2$/Dynasil 40/Al-EAA F-silane | 1:4:1:1:0.04 | 111° |
| Styrene-allyl-Si/Dynasil40/Al-EAA/F-silane | 1:4:0.5:0.125 | 68° |
| Styrene-allyl-Si/Me$_2$Si(OMe)$_2$/Dynasil40/Al-EAA/F-silane | 1:4:1:0.2:0.125 | 90° |
| Styrene-allyl-Si/Me$_2$Si(OMe)$_2$/Dynasil40/Al-EAA/F-silane | 1:1:4:0.5:0.125 | 92° |

What is claimed is:

1. Coating material comprising of the following constituent(s):
   a) at least one silane of the formula (I)

$$X_a R_b SiR^1{}_{4-a-b} \qquad (I)$$

in which
   X is a hydrolyzable group,
   R is optionally substituted alkyl, alkenyl, aryl, alkylaryl or arylalkyl,
   $R^1$ is an organic radical which is attached to the silicon via carbon and carries a reactive group,
   a is an integer from 1 to 3, and
   b is an integer from 0 to 2,
   or a (partial) hydrolyzate/condensate of this silane,
   b) at least one infrared-reflecting pigment whose particle size is situated primarily in the range from 1 to 50 μm, and
   c) a solvent and/or dispersion medium, wherein either the pigment is present at least in an amount such that the coating material, following application to a surface, is substantially opaque to light in the visible region and/or a further constituent of the coating material brings about such opacity to light of the coating material.

2. Coating material according to claim 1, characterized in that it further comprises:
   (d) at least one metal compound of the formula (II)

$$M(OR^2)_n \qquad (II)$$

in which preferably N is selected from Ge, Sn, Pb, Ti, and Zr and n is 4 or N is preferably selected from B and Al and n is 3 and $R^2$ has the same meaning as R in formula (I), or at least one complex derivative of the metal compound of the formula (II) in which some or all of the groups $OR^2$ have been replaced by one or more ligands L which are bonded more strongly to the metal N than is the group ($OR^2$), which may be present in (partially) hydrolyzed and/or cocondensed form.

3. Coating material according to claim 1, characterized in that it further comprises: (e) at least one polymeric organic additive serving as thickener or dispersant.

4. Coating material according to claim 1, characterized in that the indices of the formula (I) have the following meaning:
   X is hydrogen, halogen, hydroxyl, an optionally substituted alkoxy, acyloxy, alkylcarbonyl or alkoxycarbonyl group having preferably 1–10 carbon atoms in the alkyl or acyl group, $NR^3$ where $R^3$ is hydrogen, optionally substituted alkyl having preferably 1–10 carbon atoms or optionally substituted aryl,
   R is an optionally substituted, preferably incompletely fluorine-substituted alkyl, alkenyl, aryl, alkylaryl or arylalkyl group having from 1–10 alkyl carbons, and
   $R^1$ is a radical with at least one group which is able to enter into organic reactions, preferably selected from at least one amino, epoxide, vinyl or (meth)acrylate group.

5. Coating material according to claim 1, characterized in that it comprises at least one silane of the formula (IV)

$$X_a SiR_b \qquad (IV)$$

optionally in (partially) hydrolyzed and/or cocondensed form, in which a is an integer from 1 to 4, a+b is 4, x is preferably a $C_1$–$C_4$ alkoxy, and R is preferably a $C_1$–$C_4$ alkyl.

6. Coating material according to claim 5, characterized in that it further comprises at least one silane of the formula (III)

$$X_a R_b SiR^1{}_{4-a-b} \qquad (III)$$

optionally in (partially) hydrolyzed and/or cocondensed form, in which
   X is defined as in formula (I), $R^1$ is defined as in formula (I) and is preferably a $C_1$–$C_6$ alkyleneamine and a+b is 3.

7. Coating material according to claim 1, characterized in that it comprises at least one organic polymer modified by one or more silane groups, preferably silanized polyvinyl alcohol, silanized polyvinylbutyral or silanized styrene/allyl alcohol copolymer.

8. Coating material according to claim 1, characterized in that the infrared-reflecting pigment (b) is selected from (i) metals and metal alloys, especially aluminum, chromium, iron, copper, nickel, silver, gold, iron, tin, zinc, bronze, brass, ferrous alloys, and nickel alloys, (ii) metal sulfides, especially copper, lead and zinc sulfide, (iii) metal fluorides, especially calcium fluoride, barium fluoride and sodium fluoride, (iv) metal oxides, especially zinc oxide, titanium dioxide, magnesium oxide, antimony dioxide, (v) ceramic or vitreous pigments, and (vi) hollow, preferably dielectric, open or closed beads having a very low wall thickness.

9. Coating material according to claim 1, characterized in that the infrared-reflecting pigment (b) is present in an amount of at least 5% by weight, preferably 10–60% by weight, and with particular preference of 20–50% by weight.

10. Coating material according to claim 2, characterized in that the complex derivative of the metal compound (d) of the formula (II) is selected from compounds having the formula (V)

$$(R^2O)_m ML_n \qquad (V)$$

in which

M is Ti, Zr and Al,
    $R^2$ is $C_1$–$C_6$ alkyl,

L is selected from

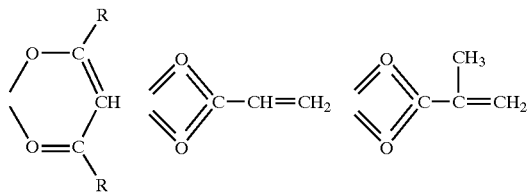

m is an integer from 1 to 3, and
n is an integer from 1 to 3.

11. Coating material according to claim 3, characterized in that the polymeric additive (e) serving as thickener or dispersant is selected from polyvinyl alcohol, polyvinyl acetate, copolymers of these two substances, poly(meth)-acrylates and copolymers thereof, (meth)-acrylic/styrene copolymers, polyacrylic acid, acrylic acid-maleic acid copolymers, styrene/allyl alcohol copolymers, polyvinylpyrrolidone and vinylpyrrolidone/acrylic acid copolymers.

12. Coating material according to claim 3, characterized in that there is at least one silane of the formula (I) in which a+b <4 and the group $R^1$ carries a radical which can be subjected to organic addition reaction or polymerization reaction, which is present in addition-reacted or copolymerized form or can be subjected to addition reaction or copolymerization with at least one polymeric additive.

13. Coating material according to claim 4, characterized in that it further comprises: (f) at least one organic monomer selected from monomers which can be subjected to addition polymerization or polyaddition, preferably those which carry (meth)acrylate, vinyl or epoxy groups, at least one silane of the formula (I) carrying a group $R^1$ which can be polymerized with this monomer.

* * * * *

UNITED STATES PATENT AND TRADEMARK OFFICE
CERTIFICATE OF CORRECTION

PATENT NO.    : 6,787,585 B2
DATED         : September 7, 2004
INVENTOR(S)   : Klaus Rose et al.

It is certified that error appears in the above-identified patent and that said Letters Patent is hereby corrected as shown below:

Column 12,
Lines 14-20, replace the middle formula with the following:

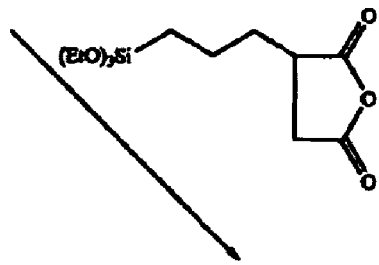

Signed and Sealed this

Twenty-seventh Day of December, 2005

JON W. DUDAS
*Director of the United States Patent and Trademark Office*